United States Patent [19]
Pfeiffer

[11] 3,710,870
[45] Jan. 16, 1973

[54] CORDLESS ELECTRIC HAND TILLER

[75] Inventor: Norman O. Pfeiffer, Rydal, Pa.

[73] Assignee: Little Wonder, Inc., Southampton, Pa.

[22] Filed: Aug. 19, 1971

[21] Appl. No.: 173,030

[52] U.S. Cl. .................................. 172/40, 172/84
[51] Int. Cl. ................................................ A01d 27/00
[58] Field of Search.......... 172/40, 41, 48, 53, 54, 84, 172/88, 94

[56] References Cited

UNITED STATES PATENTS

| 2,550,522 | 4/1951 | Bolongaro | 172/40 |
| 2,774,292 | 12/1956 | Hartmann | 172/40 |
| 2,792,769 | 5/1957 | Harshberger | 172/40 |
| 2,859,676 | 11/1958 | Pottol et al. | 172/40 |
| 2,897,902 | 8/1959 | Emmons | 172/40 |
| 3,508,616 | 4/1970 | Hubbard | 172/40 |

Primary Examiner—Robert E. Pulfrey
Assistant Examiner—R. T. Rader
Attorney—B. B. Olive

[57] ABSTRACT

A portable, battery operated tiller is adapted to be held in the hand and incorporates a plurality of replaceable digger elements or tines driven through a mechanism which gives the digger elements a motion designed to simulate manual tilling.

7 Claims, 8 Drawing Figures

PATENTED JAN 16 1973 3,710,870
SHEET 1 OF 2
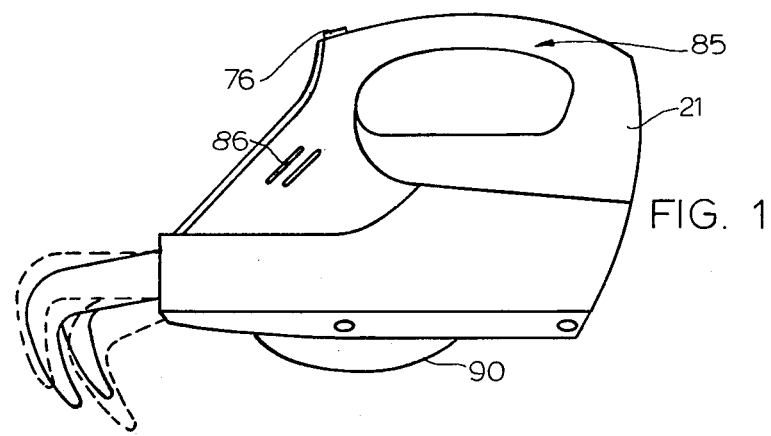
FIG. 1
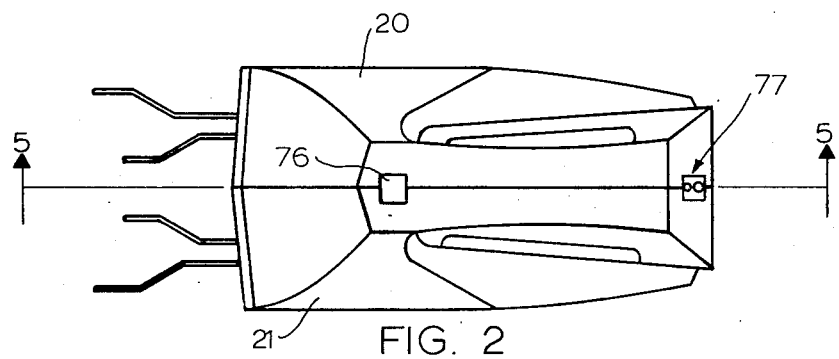
FIG. 2
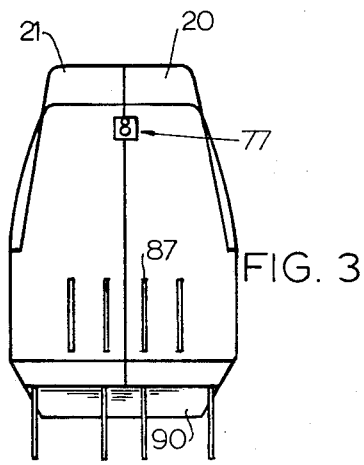
FIG. 3
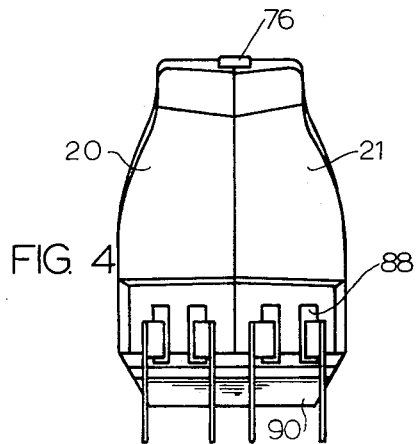
FIG. 4
FIG. 7
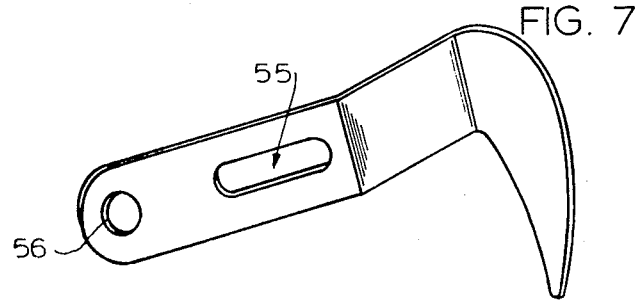
INVENTOR.
Norman O. Pfeiffer
BY
B. B. Olive
ATTORNEY INVENTOR.
Norman O. Pfeiffer

BY

B. B. Olive
ATTORNEY

CORDLESS ELECTRIC HAND TILLER

BACKGROUND OF THE INVENTION

1. Field of the Invention

The invention relates to electrically powered earth working tools. More particularly, the invention relates to a battery operated, hand held tiller for tilling small flower beds and the like and particularly to the digger element drive and digger element construction.

2. Description of the Prior Art

Various engine and electrically powered earth working tools have been known. See, for example, U. S. Pat. Nos. 2,550,522, 2,613,582 and 2,774,292. In general, all of these devices incorporate some type of long handle and are used by rolling or pushing the device along the ground and with the operator in an upright position. The mechanical designs are difficult to maneuver in small spaces, inherently require substantial power and are heavy in weight. The digging elements have normally been cast or formed of heavy construction. An objective review of the prior art shows that none of the prior art devices are light in weight and adapted to working small flower beds, small garden spaces and the like and none are adapted to performing a tilling operation with the tilling device being held in the hand during use. Furthermore, the prior art electrically powered earth working devices have required use of a long and undwieldy electrical cord connected to an external power supply, normally alternating current. In particular, the prior art has not provided a dependable, substantially lightweight, relatively low power consumption, cordless type tiller adapted to being hand held and for light tilling operations particularly in small garden spaces remote from electrical receptacles.

SUMMARY OF THE INVENTION

The invention resides in a lightweight, portable, rechargeable battery powered, cordless type tiller having a plurality of lightweight replaceable digger elements, sometimes called "tines." The digger elements are driven through a crankshaft in a kind of reciprocatory, elliptical, or clawing motion designed to simulate manual tilling such as performed in small flower beds with a small hand rake. The digger elements are very light in weight and are basically metal stampings which are cut out and bent in the desired form and which, when damaged, are inexpensive to replace. The housing is formed to provide a handle and also a compartment space for mounting a DC motor, a speed reduction gear and drive shaft mechanism, a rechargeable battery pack and a switch, a recharging connection and related circuitry. Four digger elements are employed and are arranged to dig in pairs so as to reduce the power requirements. Means are provided to adjust the depth of the digging stroke. While primarily intended to be a cordless type the mechanism of the invention readily adapts to operating off an electrical supply through an attached electrical cord.

DESCRIPTION OF THE DRAWINGS

FIG. 1 is a side view of a portable, cordless hand tiller made according to the invention.

FIG. 2 is a top plan view of the tiller.

FIG. 3 is a rear end view.

FIG. 4 is a front end view.

FIG. 7 is a perspective view of one of the digger elements or tines.

DESCRIPTION OF THE PREFERRED EMBODIMENT

Figure 5:
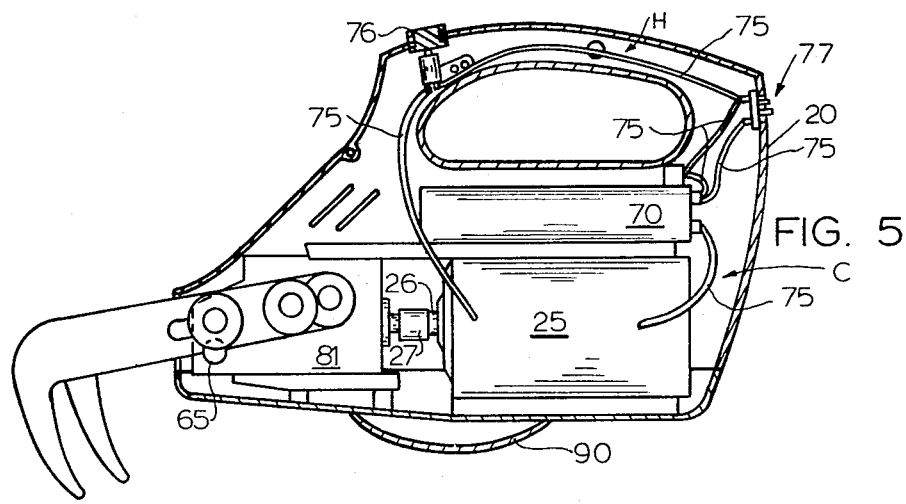
FIG. 5 is a partial elevation section view taken generally along line 5—5 in FIG. 2.
Figure 6:
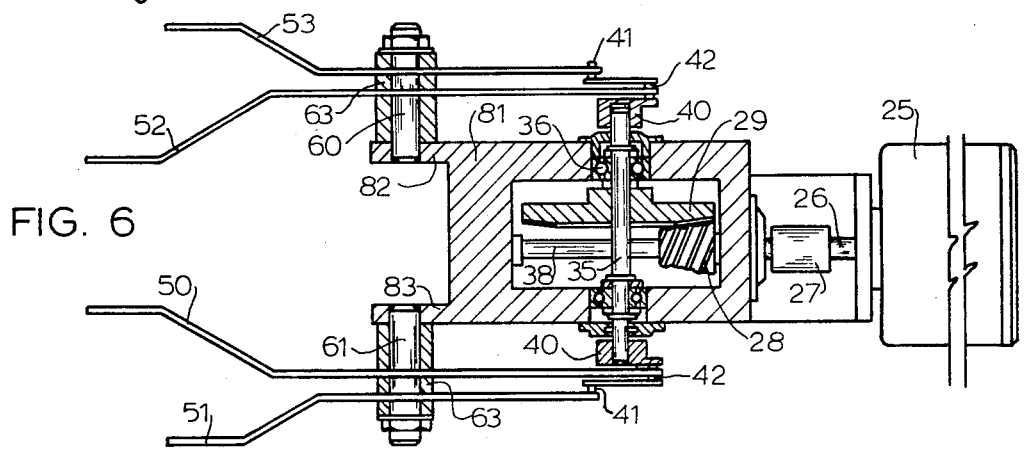
FIG. 6 is a partial plan section view of the motor, gear drive and digger elements with other parts removed for simplification.

In the embodiment of the invention shown in the drawings a right housing member 20 is joined to a left housing member 21 by means of appropriate screws 22. The housing members are preferably molded of lightweight, impact type plastic and are molded to provide a hollow storage chamber C and a handle chamber H. In chamber C there is disposed a substantially high speed DC motor 25 having a drive shaft 26 connected to a coupling 27 adapted to drive a speed reducing worm gear 28 and a spiroid gear 29. Worm gear 28 mounts on and is secured to shaft 38 which is rotatably driven by coupling 27 through suitable bearings, not shown. Spiroid gear 29 is secured to shaft 35 which rotates in appropriate bearings 36. Each end of shaft 35 mounts a crankshaft 40. Each crankshaft 40 has one outside drive pin 41 and one inside drive pin 42. The respective drive pins 41, 42 on one side drive a pair of digger elements 50, 51 and on the opposite side digger elements 52, 53. As best shown in FIG. 7, each digger element includes a slot 55 and a hole 56. Each respective hole 56 is adapted to receive a respective crankshaft drive pin 41 or 42 and as the crankshaft rotates the respective digger element slot 55 slides and reciprocates on a respective pin 60 or 61. The digger elements are separated on pins 60, 61 by suitable washers 63. In order to vary the depth of stroke the respective pins may be mounted as shown in FIG. 5 or in a respective hole 65 at a lower elevation.

Power for driving motor 25 is provided by an appropriate rechargeable battery pack 70 shown in FIG. 5. Appropriate wiring, generally designated 75, connects battery pack 70, motor 25, an off-on "Micro" switch 76, and a recharging receptacle 77. The handle chamber H is formed so that it may be employed as a conduit for portions of wiring 75 and in use may be gripped as a handle 85.

To complete the description, it will be noted that the described gear arrangement is mounted in a gear box 81 formed in the manner shown in the drawings and which includes integral flanges 82,83 for mounting pins 60, 61. Suitable front air vents 86 (FIG. 1) and rear air vents 87 (FIG. 3) are molded in the respective housings 20, 21 and which also include suitable slots 88 for accommodating the digger elements.

Figure 8:
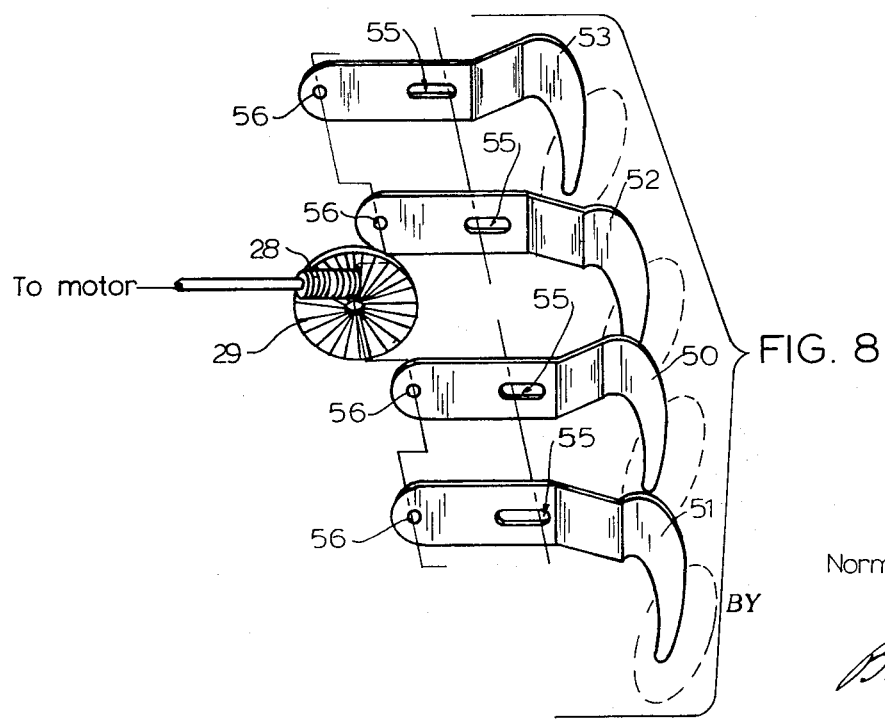
FIG. 8 is a somewhat schematic view illustrating the manner in which the digger elements are connected and driven.

In use the battery pack 70 is suitably charged through charging receptacle 77. The operator then by holding the tiller in the hand, making use of handle 85, and pressing switch 76 to energize motor 25 allows the digger elements 50, 51, 52 and 53 to penetrate the soil and to perform the tilling operation. The ground points of the tiller digger elements follow a tilted elliptical path as shown in FIG. 8 to simulate hand tilling.

Rechargeable battery packs suitable to the invention are well known and are commercially available which will allow such a tiller to operate from 30 minutes to one hour depending on the size of the tiller and such batteries are rechargeable for a very substantial number of times. Though the primary purpose of the invention is to provide a "cordless" tiller it should be understood that with an appropriate power supply, well known in the art, the tiller may operate with electrical power supplied through a cord connected to the tiller receptacle 77. Accordingly, motor 25 may be D.C., A.C. or of a universal type in correspondence with the type of supply.

The digger elements may be stamped out of relatively thin sheet metal, bent and punched as shown in the drawings and such manufacture lends itself to relatively high production, low cost and quick assembly procedures. In use, the digger elements are disposed with the respective body planes vertical, laterally spaced and parallel. The forward portions of the digger elements as shown in the drawings extend forwardly of the housing while the rear and middle portions of the digger elements are effectively contained within the housing. While the simple ground engaging point shape shown in the drawings on each digger element has been found easy to manufacture and useful in tilling the earth, such shape may be in some other configuration designed to stir or till the earth and the various elements may have different earth engaging point shapes. A group of four tine elements has been found to be a practical number and productive of relatively long battery life per charge. A larger or smaller number of digger elements may of course be employed. It may also be noticed that the rearward portions of the digger elements are not bent and occupy less width of space within the housing than the width of space occupied by the bent forward portions of the digger elements. This arrangement allows ease of internal assembly while providing maximum tilling width with minimum power consumption.

As the digger elements follow their respective elliptical paths the two inside elements 50, 52 are arranged to dig together and the two outside elements 51, 53 also dig together. This reduces the amount of power drain at any particular moment and effectively means a lower battery weight. During these movements the respective holed ends of the digger elements having the holes 56 follow a circular path dictated by the geometry of the respective crankshaft members 40 and the middle portions of the digger elements containing the respective slots 55 slide, reciprocate and pivot on and about the lateral axis provided by the respective pins 60, 61. In order to move the digger elements to varying depths of tilling, the housing members 20, 21 are molded with a protrusion 90 on which the tiller can be rocked by the user as required to vary tilling depth. Alternatively, the housing members may be molded to provide a completely flat bottom surface on which the tiller can be slid when in use.

It should be understood that the tiller of the invention is primarily intended for tilling a relatively narrow width of relatively loose soil. The suburban gardener thus has available a tool for tilling and working the earth in small flower beds and the like in which occasional tilling of already loosened earth is necessary. The gardener who enjoys working on his knees may do so in the same manner as with small hand tilling rakes. Of particular value is the ability of the tiller to work in gardens which have no readily accessible electrical power supply.

What is claimed is:

1. A portable electrically operated hand tiller adapted to tilling a relatively narrow width of earth, comprising:
   a. a housing providing an upper substantially horizontal handle shaped compartment and a lower storage compartment;
   b. an electrical motor mounted in said lower compartment and having a drive shaft extending therefrom;
   c. a manual control switch mounted in said housing and having connected wiring enabling said switch to connect said motor to an electrical source and thereby drive said shaft;
   d. reduction gear means mounted in said housing and driven by said drive shaft and having a drive member driven through said reduction means;
   e. a plurality of tine-like digger elements each having a generally elongated thin flat sheet metal body, said elements being disposed with the respective body planes vertical, laterally spaced and parallel, each element having a forward tilling end portion disposed forwardly of said housing and middle and rearward end portions disposed within said housing, said tilling end portion having its forwardmost ground engaging surface shaped to till earth;
   f. mounting means disposed within said housing and mounting said middle portions of said elements in a manner adapted to allow such middle portions to slide, reciprocate and pivot with respect to a fixed axis extending laterally of said housing and through said middle portions; and
   g. rotary drive means connected to each respective said rearward end portion of said elements and connected to be driven by said reduction means drive member, said rotary drive means being adapted to rotate each respective rearward end portion in a fixed circular path whereby said elements ground engaging surfaces are caused to move each in a fixed tilling path and in a predetermined relation to each other adapted to perform earth tilling motions.

2. A tiller as claimed in claim 1:
   a. each said middle portion of each said element being provided with a longitudinally extending slot and each rearward end portion being provided with a hole;
   b. fixed pin means comprising said mounting means and extending through said digger element slots;
   c. rotary crankshaft drive means comprising said rotary drive means and having connections to each said digger element hole whereby when said motor is energized said crankshaft means rotates and causes the holed ends of said elements to rotate together in said fixed circular path and the middle portions of said elements to slide, reciprocate and pivot on said pins and the ground engaging surfaces of said elements to trace an elliptical said tilling path.

3. A tiller as claimed in claim 2 wherein said crankshaft means is adapted to rotate selected ones of said elements out of synchronism with others of said elements.

4. A tiller as claimed in claim 2 wherein said elements comprise four elements in a side by side relation, the inner pair of which are caused by said crankshaft means to move in synchronism with each other and the outer pair of which to move in synchronism with each other but out of synchronism with said inner pair.

5. A tiller as claimed in claim 1 wherein the forward portion of each element is bent in a predetermined offset and the rearward portion is unbent such that a plurality of such elements may be mounted with the rearward portions within said housing and occuping less overall width than the forward portions disposed outside of said housing.

6. A tiller as claimed in claim 1 wherein said tiller is of a cordless type and including a rechargeable battery mounted in said housing which constitutes said electrical source and connector means enabling said battery to be recharged from an external electrical source.

7. A tiller as claimed in claim 1 wherein the bottom face of said housing is flat and includes intermediate the length thereof a protrusion enabling said tiller in use to be tilted thereon.

* * * * *